(12) United States Patent
Valligny et al.

(10) Patent No.: US 6,395,839 B2
(45) Date of Patent: May 28, 2002

(54) GRAFTED AND CROSSLINKABLE PULVERULENT THERMOPLASTIC POLYOLEFIN COMPOSITION WHICH HAS ELASTICITY AND FLEXIBILITY PROPERTIES

(75) Inventors: Dominique Valligny, Lille; Tony Marciniak, Sequedin, both of (FR)

(73) Assignee: Visteon Systemes Interieurs S.A.S., La Defense Cedex (FR)

( * ) Notice: Subject to any disclaimer, the term of this patent is extended or adjusted under 35 U.S.C. 154(b) by 0 days.

(21) Appl. No.: 09/816,134

(22) Filed: Mar. 26, 2001

Related U.S. Application Data

(60) Division of application No. 08/867,412, filed on Jun. 2, 1997, which is a continuation-in-part of application No. 08/658,624, filed on Jun. 5, 1996, now abandoned.

(51) Int. Cl.$^7$ .......................... B29C 41/18; C08L 23/00; B32B 5/16
(52) U.S. Cl. .......................... 525/310; 525/64; 525/193; 525/240; 525/232; 525/285; 525/324; 428/402; 428/403; 264/302
(58) Field of Search .................................. 264/302, 310; 525/64, 285, 240, 232, 193, 324; 428/402, 403

(56) References Cited

U.S. PATENT DOCUMENTS

| | | | |
|---|---|---|---|
| 4,225,650 A | * | 9/1980 | Van Brederode et al. ... 428/405 |
| 5,795,941 A | * | 8/1998 | Cree et al. ................... 525/240 |
| 5,814,384 A | * | 9/1998 | Akkapeddi et al. ........... 525/66 |

FOREIGN PATENT DOCUMENTS

| | | | | |
|---|---|---|---|---|
| EP | 0 130 855 | | 1/1985 | |
| EP | 0 409 992 | | 1/1991 | |
| EP | 0 482 778 | | 4/1992 | |
| EP | 0 633 289 | * | 11/1995 | ........... C08L/23/16 |

OTHER PUBLICATIONS

Patent Abstracts of Japan, vol. 018, No. 401 (C–1231), Jul. 27, 1994.

Database WPI, Derwent Publications Ltd., London, GB, Week 9421.

Patent Abstracts of Japan, vol. 007, No. 066 (C–157), Mar. 18, 1983.

* cited by examiner

*Primary Examiner*—James J. Seidleck
*Assistant Examiner*—Olga Asinovsky
(74) *Attorney, Agent, or Firm*—Millen, White, Zelano & Branigan, P.C.

(57) ABSTRACT

A bulk polymerized grafted and crosslinkable thermoplastic polyolefin powder composition having elasticity and flexibility properties, which is in the form of a powder intended for the production of flexible coatings by free flow over a hot mold, characterized in that it contains:

a) from 100 to 5% by weight and preferably from 80 to 20% by weight of at least one homopolymer of ethylene and/or at least one copolymer containing at least 50 molar % of ethylene;

b) from 0 to 95% by weight and preferably from 20 to 80% by weight of at least one thermoplastic elastomer;

c) from 0.1 to 15 parts by weight and preferably from 0.5 to 10 parts by weight of a grafting agent, per 100 parts by weight of the accumulated components "a" and "b".

This powder composition is suitable for the production of flexible coatings by its free flow over a hot mold.

34 Claims, No Drawings

GRAFTED AND CROSSLINKABLE PULVERULENT THERMOPLASTIC POLYOLEFIN COMPOSITION WHICH HAS ELASTICITY AND FLEXIBILITY PROPERTIES

CROSS-REFERENCE TO RELATED APPLICATION

This application is a Divisional of application Ser. No. 08/867,412, filed Jun. 2, 1997, which is a CIP of application Ser. No. 08/658,624, filed Jun. 5, 1996.

FIELD OF THE INVENTION

The invention relates to a grafted and cross-linkable thermoplastic polyolefin composition which has elasticity and flexibility properties.

The invention relates more especially to a grafted and crosslinkable thermoplastic polyolefin composition which has elasticity and flexibility properties, which is in the form of a powder, for the production of flexible coatings by free flow of the powder over a heated mold, according to either of the molding processes of slush molding or rotational molding.

The invention also relates to the process for the preparation of the said composition.

The invention also relates to the process for making use of the said composition.

Finally, the invention relates to the molded articles produced by making use of the composition.

TECHNICAL BACKGROUND OF THE INVENTION

Numerous parts which are made of polymeric materials are increasingly involved in motor vehicle construction, such as dashboards, door panels, consoles, and the like. Some of them are involved in a highly visible manner in the internal architecture of the vehicle, with the result that they must offer, on the visible surface, a pleasant aesthetic appearance giving, for example, the appearance of leather. This visible surface constitutes the skin of the component. This skin, coloured in bulk, must also have other properties, which are a good resistance to scratching and to chemical agents such as solvents, and a good resistance to temperature variations, ranging from severe cold to prolonged exposure to the sun in an enclosed atmosphere.

The skin thus referred to may relate to any components, (also called inserts) made of polymeric materials, particularly those forming part of the internal architecture of the vehicle, starting with the rigid inserts, generally confined to bottom-range vehicles, as far as foamed inserts fitted to more elaborate vehicles.

In the case of rigid inserts the skin or, at least its appearance, is obtained by virtue of engraving of the mold, either from the material of which the insert consists or else, for example, using a dual injection of two different materials, one for the insert the other for the skin.

In the case of foamed inserts the skin is generally produced independently of the insert itself, in a material which is compatible, on the one hand, with the foam subsequently developed between the said skin and the insert and, on the other hand, with the finishing lacquers such as the polyurethane lacquers deposited on the visible surface of the said skin in order, if need be, to make them conform to the specifications of the motor vehicle manufacturers.

To produce the skin of inserts such as, for example, the dashboard, various processes are proposed, in which one of the concerns is to produce a skin with the least possible residual stress.

In a first type of process which makes use of a prefabricated polypropylene-based sheet, the dashboard skins are produced by means of the positive or negative thermoforming process. However, the thermoforming practiced, whether positive (the surface appearance of the skin exists on the sheet before the thermoforming) or negative (the surface appearance is given to the sheet by the mold at thermoforming) generally makes use of (preheated) sheets which are preferably thin, for both technical and economic reasons.

As a result, the forms of skins which are obtained are very limited because they give rise to very thin skins and to residual stresses which, when they are released by aging, generate aesthetically unsightly small cracks.

In another type of process the dashboard skins are produced according to the slush molding process (referred to above), which allows them to be obtained generally free from residual stresses. In itself the slush molding process is a molding process employing conventional hardware (mold made of electroformed nickel heated, for example, by a hot air system) which allows the desired skins to be produced by making use of a polymer powder based on polyvinyl chloride (PVC) using the free flow technique. The skins thus produced, even if no longer containing any, or hardly any residual stresses, and even though they essentially meet the specifications of the motor vehicle manufacturers, exhibit immediate or potential disadvantages, even in the short term.

One of the real and immediate disadvantages is that, owing to their composition, PVC-based skins are fairly highly laden with volatile materials (in particular plasticizers for PVC). In use and under the effect of the temperature variations in the vehicle's interior, these materials are volatilized and migrate onto the cold regions, to condense thereon; this is the well-known phenomenon of the slow opacifying of vehicle windshields, particularly awkward for the driver's visibility and control of the vehicle.

Among the potential disadvantages, the use of PVC, in the present state of the recycling at the end of the life of materials introduced into the manufacture of motor vehicles, appears to be doomed to a more or less short term, for better protection of the environment. This is because the polymeric materials resulting, from the dissembling of scrap vehicles are at present employed (wholly or partly) as fuel in some types of furnaces, such as, for example, cement works' kilns. Now, when it is burnt, PVC converted into fuel gives off acidic gaseous effluents which are harmful to the environment.

This is why, in order to respond to a dual concern of the motor vehicle manufacturers and of the public authorities, which is firstly that for the protection of the environment (eliminating the harmful gaseous effluents generated by the burning of waste made of polymeric materials and limiting their dumping) and, next, that for the most complete recycling of the waste (made up of polymeric materials) resulting from the destruction of scrap vehicles, motor vehicle manufacturers seriously envisage limiting the number of polymers present in each vehicle but, at the same time increasing their relative quantities, and in particular replacing PVC with polyolefins, to permit easier recycling. Thus, motor vehicles would be fitted with components, such as foamed dashboards, in which the skin, the foam and the rigid insert would be made of polyolefins which can be recycled at the end of the vehicles' life. To do this, thermoplastic polyolefin compositions have already been proposed.

In this context document EP0482778 describes a polyolefin composition which has elastic properties, made up of an extruded mixture of polypropylene and of a polyolefin elastomer [ethylene-propylene rubber (EPR) and ethylene-propylene-diene monomer (EPDM)], which can be employed according to the slush molding process.

However, according to this document:

to promote the melting, in contact with the mold, of the composition which is in the form of a powder, oils such as paraffinic oils are introduced therein in a relatively high proportion in relation to the polyolefin elastomer. These oils constitute a potential risk of giving off volatile substances that pollute the environment and opacify vehicle windshields, as well as a risk of the appearance of the skin deteriorating as it ages;

to impart good heat resistance to the skin which is, by definition, thin, and to limit the presence of interfering volatile materials, crosslinking agents, including organic peroxides in particular, are introduced into the composition;

finally, to permit easy demolding of the skin, mold release agents which are external (for example dimethylsiloxane) deposited on the mold, or internal to the composition (for example methylpolysiloxane), are used; they also constitute a risk of direct pollution of the environment of the manufacturing workshops, but, above all, create greater difficulty in the subsequent operation of lacquering the skins which is at present necessary to make them conform to the motor vehicle manufacturers' specifications (appearance, degree of mattness/gloss and resistance to scratching, abrasion and to chemical agents, including solvents).

Another document, Canadian Patent 2,129,326, also describes a thermoplastic polyolefin composition which has elastic properties that can be employed in the motor vehicle sector, and is in pulverulent form. This composition includes three components:

the first (10 to 40 parts by weight) being polypropylene or a copolymer of propylene and ethylene and/or of alpha-olefin of the $CH_2=CHR$ type where R is an alkyl radical containing 2 to 8 carbons (I), which has an isotacticity value higher than 86;

the second (0 to 20 parts by weight), being a copolymer containing ethylene, propylene and/or the abovementioned alpha-olefin monomer of the $CH_2=CH-R$ type (insoluble in xylene at ambient temperature);

the third (50 to 80 parts by weight) being a fraction of an ethylene copolymer with propylene and/or the abovementioned alpha-olefin monomer of the $CH_2=CH-R$ type (soluble in xylene at ambient temperature).

However, such a composition appears to be incapable of being easily used in the slush molding process for the production of skins without being modified to some extent by the addition of flow agents for the powder composition, used in proportions such that the melting and/or the demolding run the risk of being jeopardized.

Another document, Japanese Patent Application JO3286811, describes a thermoplastic polyolefin composition with elastic properties, which has the appearance of a powder that can be employed according to the slush molding process.

This thermoplastic elastomeric composition comprises:

a polymer material made up of crystalline and noncrystalline polyolefins with a mean particle size of at least 10 micrometers and an apparent density of at least 0.2 g/ml, this material being, for example, made from ethylene, propylene and butene;

and a crosslinking agent such as, for example, an organic peroxide.

However, this composition exhibits major disadvantages when it is used as such in the slush molding process, in particular for molding. Furthermore, the skins thus obtained cannot meet the functional specifications of the motor vehicle industry and, more precisely, do not stand up well to the thermal behaviour tests, because it is found that the crosslinking remains incomplete.

Another document, EP0409992, describes a process for the preparation of particles of crosslinkable thermoplastic polyolefin polymers according to which said particles are brought into contact, in the solid state, with the crosslinking agent, in particular by means of a mineral oil; the crosslinking reaction taking place at a temperature where the polymers particles are not melted and do not stick to one another. When the contact between the polymers particles and the crosslinking agent is established, without mineral oil, the crosslinking action essentially takes place on the surface of all the polymers particles. This crosslinking is therefore heterogeneous and leads to all the disadvantages resulting therefrom when making use of the particles of those polymers. When the contact between the polymers particles and the crosslinking agent takes place in the presence of mineral oil, said oil, which migrates onto the material, constitutes a disadvantage which is exhibited later by a poor adhesion of this composition on the polyurethane foams or a poor bonding or lacquering.

Finally, a last document, JP58-001724, describes a process for the preparation of grafted and crosslinkable polyolefin particles, consisting of bringing into contact, in the solid state, said particles with the grafting and crosslinking agents, the crosslinking taking place at a temperature where the polyolefin particles are not melted and thus do not stick to one another.

This process leads to polyolefin particles which are grafted essentially on their surface, that is to say heterogeneously and which, once they, have been crosslinked, and also crosslinked heterogeneously, thus leading to polymers zones that are poorly grafted and therefore, in the case of the production of molded articles tend to migrate onto the outside of said articles during the thermal ageing.

Consequently, the problem of using the polyolefin compositions to replace polyvinyl chloride in the production of skins for the foamed or unfoamed covering of inserts remains practically untouched.

SUMMARY OF THE INVENTION

Thus, the objectives at which the invention is aimed are to provide a polyolefinic composition, based essentially on an ethylenic monomer, having elastic properties, for the manufacture of flexible coatings, which:

has the form of a powder with good flow properties, in order to be used either in the slush molding or rotational molding process;

when used, provides the flexible coatings with all the characteristics required by the motor vehicle manufacturers' functional specifications, in particular good thermal behaviour in the most severe tests (130° C.), good resistance to scratching, abrasion and chemical agents including, in particular, organic solvents, and good retention of flexibility with time (in comparison, for example, with a skin based on polypropylene or PVC);

makes it possible to produce flexible coatings of uniform thickness and free from porosity;

makes it possible to obtain flexible coatings which are free from residual stresses;

is compatible with the subsequent foaming and lacquering operations;

is free from agents which have high vapour pressures;

does not exhibit counterskin whitening phenomena, when compared with a polypropylene based skin;

does not exhibit any phenomena of exudation of the low molecular masses of the polyolefinic elastomers ensuring the absence of lump formation and good powder flow;

permits excellent demolding of the component produced;

is entirely recyclable after use, in the motor vehicle industry, in order to meet the requirements of environmental protection; and meets the present and future technical and economic requirements.

Moreover, it also relates to a process for the preparation of this composition, to a process for making use of the said composition and to the articles molded by making use of the said composition.

Upon further study of the specification and appended claims, further objects and advantages of this invention will become apparent to those skilled in the art.

Because of the abovementioned disadvantages, the inventors have pursued, through its investigations, the development of a grafted and crosslinkable polyolefin powder composition which is grafted in bulk, in the melted state, and meeting the above objectives.

The thermoplastic polyolefin powder composition according to the invention, which has elasticity and flexibility properties, intended for the production of flexible crosslinkable articles by free flow over a hot mold, is characterized in that it contains:

a) from 100 to 5% by weight and preferably from 80 to 20% by weight of at least one ethylenic polymer and/or at least one copolymer containing at least 50% in moles of ethylene;

b) from 0 to 95% by weight and preferably from 20 to 80% by weight of at least one thermoplastic elastomer;

c) from 0.1 to 15 parts by weight and preferably from 0.5 to 10 parts by weight of a grafting agent, per 100 parts by weight of the accumulated components "a" and "b".

DETAILED DESCRIPTION OF THE INVENTION

The invention relates to a grafted and crosslinkable polyolefin powder, composition which is grafted in the melted state and is crosslinkable after demolding the part made from said composition. This composition has:

elasticity and flexibility properties, used according to the process of free flow of the powder over a heated mold, for the manufacture of flexible coatings also known by the name of skins;

other essential properties like those referred to above and, in particular, ease of processing, the absence of whitening on impact and on bending of the produced parts, ease of demolding in the case of counterskin articles and very good thermal behaviour in the most severe tests.

In order to obtain such properties, although the polymers and/or copolymers used are sensitive to temperatures and contain at least 50% in moles of ethylene, the composition is grafted in the melted state, that is to say in bulk, contrary to the state of the art that suggests a grafting of the polyolefin particles in the solid state, that is to say an heterogeneous grafting that essentially takes place on the surface. Thus, the composition is grafted in its core and made potentially crosslinkable but is only completely crosslinked after its transformation, by molding and demolding, into flexible articles, in order to improve its capacity of resistance to thermal aging.

According to the invention the thermoplastic polyolefin composition which has elasticity and flexibility properties comprises at least one homopolymer of ethylene polymer and/or at least one copolymer containing at least 50%, by moles, of ethylene, constituting the component "a" of the composition.

The thermoplastic polymer based on ethylenic monomer which can be involved in the component "a" may be chosen, for example, within the group consisting of low density polyethylene (LDPE), linear low density polyethylene (LLDPE), intermediate density polyethylene (IDPE) or else a mixture of at least two of these polyethylenes, or else the mixture of at least one of these polyethylenes with a high density polyethylene (HDPE), the latter mixture containing at most 50% of HDPE.

The thermoplastic copolymer containing at least 50% by moles, of ethylene which can be involved in the component "a" may be chosen within the group consisting of:

copolymers of ethylene and of at least one alkylene, in which the alkylene may be a $C_4$–$C_{12}$ and preferably $C_5$–$C_{10}$ monomer, such as, for example, butene, pentene, iso-butene, diisobutene, hexene, methylpentene, ethylbutene, heptene, octene, nonene, 2,5-dimethyl-4-heptene, 2-methyl-2-octene, decene, 2,2-dimethyl-4-octene, 5-methyl-5-nonene, trimethylheptene, undecenes (1, 4 or 5), 2,4,7-trimethyl-4-octene or dodecene;

copolymers of ethylene and of at least one acrylic monomer in which the acrylic monomer may be acrylic, methacrylic, itaconic, crotonic or fumaric acid, maleic anhydride or else, isocrotonic, aconitic, mesaconic, sinapic, undecylenic, angelic or hydroxyacrylic acid, acrolein, acrylamide, acrylonitrile, esters of acrylic and methacrylic acids and in particular methyl or ethyl acrylate or methacrylate, imidazoles, styrene or alpha-methylstyrene; the acidic functional groups thus referred to may be in the acidic form or in a form which is at least partially converted into salt by agents based on monovalent metals or the like, such as sodium, potassium or ammonium, or polyvalent metals such as calcium, magnesium or zinc, or else neutralized with amines;

copolymers of ethylene and of at least one vinyl monomer, such as, for example, vinyl acetate, methylvinyl ketone, vinylpyrrolidone, vinylcaprolactam or vinyl ethers, in particular methyl, ethyl, isobutyl or other ethers;

copolymers of ethylene and of at least two other monomers taken within the abovementioned groups.

These polymers and/or copolymers are obtained by methods which are well known to a person skilled in the art and also include those making use of a catalyst of the metallocene type.

The copolymers involved in the component "a" of the composition according to the invention contain quantities of ethylene which are generally between 60% and 98% and preferably between 70% and 90%, expressed by weight.

According to the invention the component "a" preferably has a "melt flow index" (MFI) defined by ASTM standard D 1238L (190° C. and 2.16 kg) of between 15 and 300 g in 10 minutes and preferably between 20 and 50 g in 10 minutes, and a flexural elasticity modulus (FEM) defined by ASTM standard D70, at most equal to 500 MPa and more preferably at most equal to 50 MPa.

According to the invention the thermoplastic polyolefin composition which has elasticity and flexibility properties may comprise at least one elastomer constituting the component "b". This component "b" may be chosen from the thermoplastic elastomers:

used alone, such as: ethylene-propylene rubber (EPR), ethylene-propylene-diene monomer (EPDM), styrene-butadiene-styrene (SBS), styrene-ethylene-butadiene-styrene (SEBS), styrene-butadiene rubber (SBR), optionally partially or completely crosslinked, styrene-isoprene-styrene (SIS), butyl rubber (BR), nitrile-butyl rubber (NBR), hydrogeno-nitrile-butyl rubber (HNBR), and polyvinyl acetate;

or used in accordance with a mixture, either in reactor or by extrusion, of polyethylene and/or semi-crystalline polypropylene with at least one abovementioned elastomer, such as, for example, polyethylene/ethylene-propylene rubber (PE/EPR), polyethylene/ethylene-propylene-diene monomer (PE/EPDM), it being possible for the elastomeric fraction to be optionally partially or completely crosslinked.

or belonging to the group of polypropylenes (homopolymers) with amorphous and semi-crystalline blocks and copolymers of propylene-ethylene or alpha-olefin with amorphous and semi-crystalline blocks.

The polyolefin elastomer used in the composition preferably has a solubility of 100% to 70% in xylene at 20° C.

According to the invention the thermoplastic polyolefin composition which comprises polyolefin polymers and/or copolymers of low heat resistance is reinforced by the presence of at least one grafting agent constituting the component "c" is permitting the subsequent crosslinking of the grafted composition, after it has been used in a molding-demolding operation of a flexible article.

The component "c" is chosen within the group consisting of the silanes which have the general formula $XYSiZ_2$ in which:

X is an olefinically unsaturated monovalent hydrocarbon radical or else a hydroxycarbonoxy radical which is reactive towards the free-radical sites which are created;

Y is a radical X or a radical Z;

Z is a hydrolyzable organic radical.

The radical X may thus be one of the vinyl, alkyl, butenyl, cyclohexenyl, cyclopentadienyl, or cyclohexadienyl radicals but is preferably a vinyl radical.

The hydrolyzable organic radical Z may be an alkoxy radical such as the methoxy, ethoxy and butoxy radicals or else an acyloxy radical such as the formyloxy, acetoxy, or propionoxy radicals, radicals derived from oxime such as, for example: —ON=C—$(CH_3)_2$, —ON=C—$CH_2$—$C_2H_5$—ON=C $(C_6H_5)_2$ or else aminosubstituted radicals such Was alkylamino or arylamino radicals including, for example, —$NHCH_3$, —$NHC_2H_5$ and $NH(C_6H_5)_2$.

The silane is preferably chosen within the group consisting of vinyltrimethoxysilane, vinyltriethoxysilane, vinyltrimethoxyothoxysilane, 3-methacryloxypropyltrimethoxysilane or else a silicone-modified silane.

Contrary to the state of the art in which the grafting is carried out in the solid state, of fine polymers particles, leading to a partial grafting, essentially on their surface, and thus heterogeneous and therefore to an heterogeneous crosslinking that leaves some polymers zones poorly grafted, the operation of grafting the component "c" onto the mixture of components "a" and "b" or preferably onto component "a" alone, is performed in the melted state, that is to say in bulk and preferably under mechanical shearing of the components, according to processes which are known to a person skilled in the art. This operation consists in reacting the polyolefin compound, in the melted state, with a silane, preferably in the presence of an agent generating free radicals, creating free radical sites in the polyolefin compound.

The grafting operation in the melted state is generally performed at a temperature of at least 140° C., in an appropriate technology, for example a twin-screw extruder, the screws rotating in opposite directions, in which the polyolefin compound and the grafting agent are brought into contact at the appropriate temperature; the grafting agent may be introduced into the equipment used in a form dispersed at the surface of the polyolefin compound, or else introduced directly, for example by injection, into the reaction mixture.

The agent generating free radicals, referred to above, may be introduced in a form dispersed at the surface of the polyolefin compound or else may be introduced by injection simultaneously with the grafting agent, optionally in the presence of an appropriate solvent; in a portion of 0.1 to 8 parts by weight per 100 parts by weight of the grafting agent (component "c").

The agent generating free radicals which is capable of creating free-radical sites in the polyolefin compound is an organic peroxide or a perester such as, for example, tert-butylperoxy 3,5,5-trimethylhexanoate, 2,5-dimethyl-2,5-di(benzoylperoxy)hexane, tert-butyl-peroxy 2-ethylhexyl carbonate, tert-butylperoxy acetate, tert-amylperoxy benzoate, tert-butylperoxy benzoate, 2,2-di(tert-butylperoxy)butane, n-butyl 4,4-di(tert-butyl-peroxy) valerate, ethyl 3,3-di(tert-butylperoxy)butyrate, dicumyl peroxide, tert-butyl cumyl peroxide, di-tert-amyl peroxide, di(2-tert-butylperoxyisopropyl)benzene, 2,5-dimethyl-2,6-di(tert-butylperoxy)hexane, di-tert-butyl peroxide, 2,5-dimethyl-2,5-di-tert-butylperoxy-3-hexyne, 3,3,6,6,9,9-hexamethyl-1,2,4,5-tetraoxacyclononane, tert-butyl hydroperoxide, 3,4-dimethyl-3,4-diphenylhexane, 2,3-dimethyl-2,3-diphenylbutane and tert-butyl perbenzoate and azo compounds, for example azobisisobutyronitrile and dimethyl azodiisobutyrate; the said agent is preferably chosen within the group consisting of dicumyl peroxide, tert-butyl cumyl peroxide, di-tert-amyl peroxide, di-tert-butyl peroxide and 2,5-dimethyl-2,5-di(tert-butylperoxy)-3-hexyne.

The thermomechanical characteristics of the grafted thermoplastic polyolefin composition according to the invention are preferably the following:

melt flow index (ASTM Standard 1238L: 190° C. and 2.16 kg) 20 to 30 g/10 min.

density (ASTM Standard 1505): approximately 0.87 to 0.91 $g/cm^3$ flexural modulus (ASTM Standard D 790): preferably<50 MPa yield point stress (ASTM Standard D 638): approximately 4 to 5 MPa elongation at break (ASTM Standard D 638): >400% notched bat impact strength (ASTM Standard D 256) at 23° C. >500 J/m at 0° C. >500 J/m heat deflection temperature (HDT) (ASTM Standard D 648) >40° C.

According to the invention the thermoplastic polyolefin composition which has elasticity and flexibility properties may contain at least, one internal mold release agent.

The internal mold release agent may be chosen from one of the conventionally known agents belonging to the group including the class of the montanic derivatives and montanic esters, stearate salts, their amines, their amides, such as ethylene bis stearamide, hydrogenated hydrocarbon resins, polyethylene, polypropylene and ethylene/vinyl acetate (EVA) copolymer waxes, resins from copolymerization of aliphatic and/or aromatic monomers, silicone oils or else silicone-modified ethylene oxide and/or propylene oxide oils.

The internal mold release agent may be preferably chosen within the group made up of alkaline-earth stearates such as calcium and magnesium stearate, the most widely employed of which is magnesium stearate, silicone oils or else silicone-modified ethylene oxide and/or propylene oxide oils.

The internal mold release agent which, finally, is preferably used in the composition according to the invention is magnesium stearate, in the case of which it has been ascertained by experiment, the absence of the phenomenon of migration of the core towards the surface of the skin containing it, a phenomenon which is generally manifested at the surface of the said skin by the appearance of a slight whitish deposit whose presence is unacceptable in view of the qualification standards of some motor vehicle manufacturers.

The magnesium stearate used as internal mold release agent offers many advantages, the most notable of which are listed below:

it ensures, by its presence, excellent demolding of the skin; and it allows the skin to be lacquered with good adhesion of the lacquer following a special preparation, such as flaming or the use of an adhesion primer.

The internal mold release agent may be introduced into the composition of the invention on the occasion of a mixing operation, for example at the time of the grafting operation, or else at the time when the mixing of the grafted composition with a crosslinking catalyst is performed.

The internal mold release agent is introduced into the composition in a proportion of 0.1 to 6 parts by weight and preferably in a proportion of 0.5 to 3 parts by weight per 100 parts by weight of the components "a" and "b".

However, the mold release agent may also be external and, in this case, it is deposited directly on the surface of the mold. In this case this agent may be chosen within the group consisting of the class of silicones, aliphatic and aromatic naphthas and poly-phosphatides or oils which are well known to a person skilled in the art. However, in addition, the mold release agent, whether internal or external, may be replaced by a surface treatment of the mold, making it non-adhesive.

The composition according to the invention is prepared according to a number of manufacturing processes.

According to a first process the various constituents of the composition according to the invention are introduced, mixed and then grafted, in a mixing and/or extrusion zone, heated at least to the melting temperature of said mixture. Then the materials originating from the mixing and/or extrusion zone, transformed into granulates or another form, are subjected to cryogenic grinding in such a way that this produces a grafted crosslinkable thermoplastic polyolefin powder which is grafted in bulk and has the required elasticity and flexibility properties.

According to another process the composition according to the invention may be prepared by microgranulation, which consists of an extrusion of the composition in the melted state through a microdie and flat cutting in aqueous medium, which results in a grafted crosslinkable thermoplastic polyolefin powder which is grafted in bulk which has elasticity and flexibility properties.

The thermoplastic polyolefin powder according to the invention, obtained according to a suitable process such as, for example, those mentioned above, has a maximum particle size of approximately 700 mm and a medium size of approximately 500 mm, but preferably of approximately 300 mm.

This is why, in order to ensure the best flow over the mold of the powder resulting from one or other of the abovementioned processes for preparation of the composition according to the invention, to avoid local overloading of this composition, whatever the shape of the mold, and to decrease the thickness of the skins to be produced, it is desirable to associate, with the composition according to the invention, a flow aid for the powders, by dry mixing.

This flow aid is desirably a precipitated silica, of spherical form and preferably surface-grafted with a silane or a silicone oil.

The quantity of flow aid introduced into the composition according to the invention is between 0.1 and 5 parts and preferably between 0.1 and 1 part by weight per 100 parts by weight of the components "a" and "b".

The precipitated and grafted silica used as flow aid in the composition according to the invention has the following characteristics:

hydrophobic or hydrophilic, loose white powder

BET specific surface (DIN standard 66131): <300 $m^2g^{-1}$ mean diameter of the primary particles: <50 nanometres packing density (DIN-ISO Standard 787/XI): <200 $g/l^{-1}$ Various adjuvants of a known type may also be introduced into the composition according to the invention during the preparation of the mixture of the constituents, or even subsequently, during the preparation of the composition according to the invention, by the use of its various constituents "a", "b" and "c". These various adjuvants are, for example, heat or photochemical stabilizers, antioxidants, lubricants, antistatic agents, flame retardants or still others.

In addition, some powdered inorganic materials may also be introduced into the composition according to the invention; they may be chosen from inorganic salts and/or oxides which have or have not undergone a surface treatment, such as calcium, magnesium or zinc carbonates, dolomite, lime, magnesia, aluminium trihydroxide, alumina, clays and other silicoaluminous substances, preferably talc, kaolin, mica, bentonite, wollastonite and glass beads.

Finally, other organic powdered materials of natural or synthetic origin may also be introduced, such as, for example, colorants or carbon black.

All these powdered materials may be used by themselves or in combination.

The dimensions of these inorganic materials are generally between 0.01 and 300 mm and preferably between 0.1 and 100 mm.

These powdered inorganic materials may be introduced into the compositions according to the invention in a proportion of 0.1 to 5 parts and preferably of 0.1 to 2 parts by weight per 100 parts by weight of the components "a" and "b".

Since the grafted and crosslinkable thermoplastic polyolefin composition is prepared by an appropriate means, it is liable to be used for the production of crosslinkable flexible articles by either the slush molding or the rotational molding process eventually, in the presence of a hydrolysis catalyst.

The hydrolysis catalyst thus referred to is generally incorporated into the thermoplastic polyolefin composition according to the invention immediately before it is used according to either the slush molding or the rotational molding process.

According to one embodiment the grafted and crosslinkable polyolefin composition is delivered according to two separate components, one of the components comprising the polyolefin composition to be crosslinked, the other component contributing the hydrolysis catalyst in an appropriate form.

These two components may then be mixed according to the desirable proportions to allow the crosslinking of the composition, according to the invention, in the presence of water.

The hydrolysis catalyst may be chosen from various compounds which are well known to a person skilled in the art, which are generally in a liquid form, but, in the case of some, also in a solid form. These various compounds form the group consisting of metal carboxylates such as dibutyltin dilaurate (DBDL), tin dibutyltrilaurate (DBTL), tin acetate, stannous acetates tin octoate, tin oxalate, tin dibutyltriacetate (DBTA), dibutyltin maleate (DBTM), tin butyltricaprylate (BTTO), iron 2-ethylhexoate, organometallic compounds such as titanium esters and chelates, for example tetrabutyl titanate, tetranonyl titanate, diisopropyl bis(acetylacetonyl) titanate, organic bases such as ethylamine, hexylamine, dibutylamine and piperidine and acids such as inorganic acids and fatty acids. The hydrolysis catalyst is preferably chosen from organic tin compounds, for example dibutyltin dilaurate, tin dibutyltrilaurate, tin butyltricaprylate, tin oxalate, tin dibutyltriacetate, dibutyltin maleate tin octoate.

The hydrolysis catalyst when implemented is introduced into the grafted crosslinkable composition according to the invention in a proportion of 0.001 to 0.5 parts by weight and preferably in a proportion of 0.001 to 0.3 parts by weight relative to 100 parts by weight of the components "a" and "b" of the said composition.

When the hydrolysis catalyst is in a solid form it may be introduced in the form of a fine powder (from 0.1 mm to 10 mm) optionally coated with a meltable thermoplastic jacket giving it, when used according to either the slush molding or the rotational molding process, a delay effect which is particularly favourable for controlling the start of the crosslinking which is thus started after the operation of hot forming and demolding. But the solid catalyst may also be in the form of a fine powder component, obtained, for example, by extrusion, followed by a grinding, of a mixture made of said catalyst, with:
- a polypropylene wax (MFI superior to 100 g/10 min. at 190° C. under 2,16 kg), grafted or not, by means of a component such as maleic anhydride;
- a thermoplastic polyurethane (TPU);
- a thermoplastic polyester.

This fine powder component may be microencapsulated in order to give it the same retarding effect already mentioned.

When the hydrolysis catalyst is in a liquid form it may be used through the intermediacy of a finely divided, powdered inorganic solid support such as precipitated silica referred to earlier in the role of flow aid or else through the intermediacy of a thermoplastic compound corresponding to the component "a" or microencapsulated in a thermoplastic meltable envelope to give it a retarding effect or else again introduced through the intermediacy of a gaseous carrier, for example steam injected into an appropriate vessel.

The crosslinking of the grafted and crosslinkable thermoplastic polyolefin composition is performed after hot forming in the presence of the hydrolysis catalyst, according to either the slush molding or the rotational molding process, by exposing the molded article to moisture.

Atmospheric, moisture is usually sufficient to permit this crosslinking. However, the crosslinking may be accelerated either by the use of a controlled artificial moist atmosphere or by immersion of the article in water, or else by raising the temperature of the treatment medium, whether it is gaseous or liquid.

By way of example, the crosslinking of the molded article may be performed in a hot environment at a temperature of at least 50° C. in the presence of water vapour.

However, the crosslinking of the thermoplastic composition according to the invention may be performed:
- either by simple impregnation of the flexible coating with the pure hydrolysis catalyst when it is liquid or dissolved in water or a solvent;
- or by immersion in a liquid or gaseous medium containing the hydrolysis catalyst.

Thus, the composition according to the invention is used for the production of skins by the method of the flow of powder over a hot mold. These skins are intended to be fitted to inserts, foamed or otherwise, such as, for example, dashboards which, on being tested, meet the highest requirements of the motor vehicle manufacturers.

The invention will be understood better by virtue of the illustrative and non-limiting examples described below.

EXAMPLE 1

This example illustrates a composition according to the invention, subsequently used in the manufacture of foamed dashboards.

The various components constituting the composition according to the invention were the following:
- component "a": 100 parts by weight of ethyleneoctene (marketed by Dow under the reference Engage 8400);
- component "c": 2 parts by weight of the mixture of the grafting agent, which is vinyltrimethoxysilane, associated with a radical generator, which is dicumyl peroxide, the latter being present in the master mix thus formed in a proportion of 8.5% by weight relative to the grafting agent.

To these two components there are added, in parts by weight, per 100 parts by weight of the cumulative total of the components "a" and "b":
- 2 parts by weight of carbon black;
- 0.5 part by weight of the mold release agent, which is magnesium stearate;
- 0.1 part by weight of a flow aid, which is precipitated silica (marketed by Degussa under reference Sipernat 22S), of spherical form.

All the aforementioned components with the exception of the flow aid were introduced into a twin-screw extruder brought to a temperature of 220° C. The polyolefin component "a" has been introduced first in the extruder in order to be melted, and the other components (grafting agents, generator of free radicals, carbon black and demolding agent) have been introduced in a mixing zone, downstream of the melting zone. Grafted and crosslinkable granulates have then been produced from the mixture (melted) of the various components.

The granules thus prepared were subjected to cryogenic grinding, (in the presence of liquid nitrogen at a temperature of between −100° C. and −70° C.).

On leaving the grinding the grafted and crosslinkable thermoplastic polyolefin composition was collected in the form of fine powder whose median particle size was approximately 400 mm and the maximum particle size approximately 700 mm.

The grafted and crosslinkable polyolefin powder was then introduced into a fast mixer (Henschel) together with the abovementioned flow aid.

The hydrolysis catalyst dibutyl tin dilaurate (DBTL) was introduced into this mixer on a support consisting of precipitated silica, in a proportion of 0.1 part by weight per 100 parts by weight of component "a".

Tests of the powder flow and of the production of skins by means of this powder were performed on a nickel mold heated to a temperature of between 200° C. and 240° C. and made it possible to obtain skins of good quality for a dashboard to be foamed, of uniform thickness (1 mm).

The skins thus obtained were subjected to crosslinking in an appropriate vessel, into which water vapour was injected and whose ambient temperature was 60° C.

Foamed, ,unlacquered dashboards were then produced, which were subjected to qualification tests for the motor vehicle manufacturers; they were found to be very close to specification.

EXAMPLE 2

This example illustrates another composition according to the invention, subsequently used in the manufacture of foamed dashboards. The various components constituting this composition were the following:

component "a": 100 parts by weight of a mixture including 90 parts by weight of an ethyleneoctene copolymer (marketed by Dow under the reference Engage SM 8400) and 10 parts by weight of linear low density polyethylene (LLDPE) (marketed by Neste under reference NCPE 8030);

component "c": 2 parts by weight of the grafting agent, which is vinyltrimethoxysilane associated with a radical generator, which is dicumyl peroxide (the latter being present in the master mix thus formed in a proportion of 8.5% by weight relative to the grafting agent).

To these two components there is added, in parts by weight, per 100 parts by weight of the cumulative total of the components "a":

0.1 part by weight of a flow aid which is a precipitated silica of hydrophobic nature (marketed by Degussa under reference Sipernat D10) of spherical form, onto which a silicone oil is grafted.

All the components with the exception of the flow aid were introduced into a twin-screw extruder brought to a temperature of 180° C., the component "a" being introduced first in order to be melted and the other components (grafting agent, generator of free radicals) in a mixing zone down the melting zone. Thus, microgranulates were produced from the melted mixture of the various components.

On leaving the microgranulation the grafted and crosslinkable thermoplastic polyolefin composition was collected in the form of a fine powder whose median particle size was approximately 400 mm and the maximum particle size approximately 500 mm.

Tests of powder flow and of the production of skins by means of this powder were performed on a nickel mold treated with a mold release agent, which is a mixture of aliphatic naphthas and heated to a temperature of between 200° C. and 240° C. The tests made it possible to obtain skins of good quality for a dashboard to be foamed, of uniform thickness (1 mm).

The skins thus obtained were subjected to crosslinking in an appropriate vessel, into which water vapour containing 5% by weight of dibutyltin dilaurate (DBTL) was injected and the ambient temperature of which was 60° C. (duration of the treatment: 1 h 30 min). Foamed, unlacquered, dashboards were then made, which were subjected to qualification tests for the motor vehicle manufacturers: they were found to be very close to specification.

The entire disclosure of all applications, patents and publications, cited above and below; and of corresponding French application No. 9604296, filed Apr. 1, 1996, are hereby incorporated by reference.

The preceding examples can be repeated with similar success by substituting the generically or specifically described reactants and/or operating conditions of this invention for those used in the preceding examples.

From the foregoing description, one skilled in the art can easily ascertain the essential characteristics of the invention and, without departing from the spirit and scope thereof, can make various changes and modifications of the invention to adapt it to various usages and conditions.

What is claimed is:

1. A process for preparing, by the slush moulding or the rotational moulding process, a flexible article by means of a grafted and crosslinkable thermoplastic polyolefin powder composition, said process comprising:

(i) introducing a hydrolysis catalyst crosslinking agent into a bulk polymerized grafted and crosslinkable thermoplastic polyolefin powder immediately before said bulk polymerized grafted and crosslinkable powder is used in the slush moulding or rotational moulding process, the bulk polymerized grafted and crosslinkable thermoplastic polyolefin powder resulting from extrusion of a composition comprising:

a) from 100 to 5% by weight of at least one polymer or copolymer of ethylene containing at least 50% by moles of ethylene;

b) from 0 to 95% by weight of at least one thermoplastic elastomer; and c) from 0.1 to 15 parts by weight of a grafting agent, per 100 parts by weight of combined components (a) and (b);

(ii) forming a molded article by free flow of the bulk polymerized grafted and crosslinkable thermoplastic polyolefin powder composition containing the hydrolysis catalyst crosslinking agent, over a hot mould according to the slush moulding or the rotational moulding process; and, (iii) exposing the moulded article of (ii) to moisture for crosslinking.

2. A process according to claim 1, wherein the hydrolysis catalyst is introduced into the bulk polymerized grafted and crosslinkable thermoplastic polyolefin powder composition in a proportion of 0.001 to 0.5 parts by weight per 100 parts by weight of the accumulated components (a) and (b).

3. A process according to claim 1, wherein the bulk polymerized grafted and crosslinkable polyolefin powder further comprises a flow aid, and the crosslinking of the moulded article (iii) is carried out at a temperature of at least 50° C., in moist environment.

4. A process according to claim 1, wherein the bulk polymerized grafted and crosslinkable thermoplastic polyolefin powder results from extrusion of the polyolefins of step (i) grafted in the molten state by the grafting agent (c).

5. A process according to claim 1, wherein the at least one polymer of ethylene forming part of the component (a) of the bulk polymerized grafted and crosslinkable thermoplastic polyolefin powder is selected from the group consisting of low density polyethylene (LDPE), linear low density polyethylene (LLDPE), intermediate density polyethylene (IDPE), a mixture of at least two of said polyethylenes, and a mixture of at least one of said polyethylenes with a high density polyethylene (HDPE), the latter mixture containing not more than 50% by weight of HDPE.

6. A process according to claim 1, wherein the at least one polymer or copolymer of ethylene forming part of component (a) of the bulk polymerized grafted and crosslinkable thermoplastic polyolefin powder is a copolymer of ethylene and at least one alkylene monomer selected from the group consisting of a $C_4$–$C_{12}$ alkylene.

7. A process according to claim 6, wherein the alkylene monomer is selected from the group consisting of butene, pentene, isobutene, diisobutene, hexene, methylpentene, ethylbutene, heptene, octene, nonene, 2,5-dimethyl-4-heptene, 2-methyl-2-octene, decene, 2,2-dimethyl-4-octene, 5-methyl-5-nonene, tri-methylheptene, undecenes (1,4 or 5), 2,4,7-trimethyl-4-octene and dodecene.

8. A process according to claim 1, wherein the at least one polymer or copolymer of ethylene forming part of component (a) of the bulk polymerized grafted and crosslinkable thermoplastic polyolefin powder comprises (A) a copolymer of ethylene and of at least one acrylic monomer, in which the acrylic monomer is selected from the group consisting of acrylic, methacrylic, itaconic, crotonic, and fumaric acid, maleic anhydride, isocrotonic, aconitic, mesaconic, sinapic, undecylenic, angelic and hydroxyacrylic acid and salts thereof, acrolein, acrylamide, acrylonitrile, esters of acrylic and methacrylic acids, methyl and ethyl acrylate and methacrylate, or (B) a copolymer of ethylene and an imidazole, styrene or alpha-methylstyrene.

9. A process according to claim 1, wherein the at least one polymer or copolymer of ethylene forming part of the component (a) of the bulk polymerized grafted and crosslinkable thermoplastic polyolefin powder comprises a copolymer of ethylene and of at least one monomer selected from the group consisting of vinyl acetate, methyl vinyl ketone, vinylpyrrolidone, vinylcaprolactam, a vinyl ether, a methyl, ethyl and isobutyl vinyl ether.

10. A process according to claim 6, wherein the copolymer is formed from ethylene and from at least two other alkylene monomers.

11. A process according to claim 1, wherein said polymer or copolymer of component (a), of the bulk polymerized grafted and crosslinkable thermoplastic polyolefin powder is a copolymer containing a quantity of ethylene which are is between 60% and 98%, expressed by weight.

12. A process according to claim 1, wherein the component (a) of the bulk polymerized grafted and crosslinkable thermoplastic polyolefin powder has a "melt flow index" (MFI, defined by ASTM standard D1238L: 190° C. and 2.16 kg) of between 15 and 300 g in 10 minutes, and a flexural elasticity modulus (FEM, defined by ASTM standard D70) of not more than 500 MPa.

13. A process according to claim 1, wherein the polyolefinic elastomer forming part of the component (b) of the bulk polymerized grafted and crosslinkable thermoplastic polyolefin powder is selected from the group consisting of ethylene-propylene rubber (EPR), ethylene-propylene-diene monomer (EPDM), styrene-butadiene-styrene (SBS), styrene-ethylene-butadiene-styrene (SEBS), styrene-butadiene rubber (SBR), optionally partially or completely crosslinked, styrene-isoprene-styrene (SIS), butyl rubber (BR), nitrile-butyl rubber (NBR), hydrogeno-nitrile-butyl rubber (HNBR) and polyvinyl acetate.

14. A process according to claim 1, wherein the polyolefinic elastomer forming part of the component (b) of the bulk polymerized grafted and crosslinkable thermoplastic polyolefin powder comprises a mixture of polyethylene with at least one elastomer selected from the group consisting of polyethylene/ethylene-propylene rubber (PE/EPR) and polyethylene/ethylene-propylene-diene monomer (PE/EPDM).

15. A process according to claim 1, wherein the grafting agent constituting the component (c) of the bulk polymerized grafted and crosslinkable thermoplastic polyolefin powder is selected from the group consisting of silanes of the formula $XYSiZ_2$, in which:
   the radical X is selected from the group consisting of the vinyl, alkyl, butenyl, cylohexenyl, cyclopentadienyl and cyclohexadienyl radicals,
   the hydrolysable radical Z is selected from the group consisting of:
   alkoxy, methoxy, butoxy;
   acyloxy, acetoxy, propionoxy;
   oxime, $—ON=C—(CH_3)_2$, $ON=C(C_6H_5)_2$;
   alkylamino, and arylamino;
   the radical Y is X or Z.

16. A process according to claim 15, wherein the grafting agent is selected from the group consisting of vinyltrimethoxysilane, vinyltriethoxysilane, vinyltrimethoxyothoxysilane, 3-methacryloxypropyltrimethoxysilane and a silicone-modified silane.

17. A process according to claim 1, wherein the hydrolysis catalyst crosslinking agent of the step (i) is selected from the group consisting of dibutyltin dilaurate, stannous acetate, tin octoate, dibutyltin dioctoate, iron 2-ethylhexoate, tetrabutyl titanate, tetranonyl titanate, diisopropyl bis(acetylacetonyl) titanate, ethylamine, hexylamine, dibutylamine, piperidine, inorganic acids, dialkyltin mercaptide and fatty acids.

18. A process according to claim 1, wherein from 0.1 to 8 parts by weight per 100 parts by weight of the grafting agent, of an agent generating free radicals, which is selected from the group consisting of organic peroxides and esters, are farther added to the composition comprising the components (a), (b) and (c) before extrusion of said composition.

19. A process according to claim 18, wherein the agent generating free radicals is selected from the group consisting of: dicumyl peroxide, tert-butyl cumyl peroxide, di-tert-amyl peroxide, di-tert-butyl peroxide and 2,5-dimethyl-2,5-di-tert-butyl-peroxy-3-hexyne.

20. A process according to claim 1, wherein an internal release agent, which is selected from the group consisting of the class of montanic derivatives, stearate salts, their amines, their amides, hydrogenated hydrocarbon resins, polyethylene, polypropylene and ethylene/vinyl acetate (EVA), copolymer waxes, resins from copolymerization of aliphatic and aromatic monomers, silicone oils and silicone-modified ethylene oxide and/or propylene oxide oils, is further added to the composition comprising the components (a), (b) and (c) before extrusion of said composition.

21. A process according to claim 20, wherein the internal mould release agent is selected from the group consisting of calcium and magnesium stearate, silicone oils and silicone-modified ethylene oxide and propylene oxide oils.

22. A process according to claim 20, wherein the internal mould release agent is present in a proportion of 0.1 to 6 parts by weight per 100 parts by weight of the components (a) and (b).

23. A process according to claim 3, wherein the flow aid is selected from the group consisting of precipitated silica and silica surface modified with a silane or with a silicone oil.

24. A process according to claim 23, wherein the quantity of flow aid is between 0.1 and 5 parts by weight of the components (a) and (b).

25. A process according to claim 1, wherein at one of a heat or photochemical stabilizer, an antioxidant, a lubricant, an antistatic agent or a flame retardant is further introduced into the composition comprising the constituents (a), (b) and (c) before extrusion of said composition.

26. A process according to claim 1, wherein the composition comprising the constituents (a), (b) and (c) before extrusion further comprises powdered inorganic materials selected from the group consisting of calcium, magnesium and zinc carbonates, dolomite, lime, magnesia, aluminium trihydroxide, alumina, talc, kaolin, mica, bentonite, wollastonite and glass.

27. A process according to claim 20, wherein the powdered materials are introduced in a proportion of 0.1 to 5 parts by weight per 100 parts by weight of the components (a) and (b).

28. A process according to claim 1, wherein the composition comprising the constituents (a), (b) and (c) before extrusion further comprises at least one powdered material selected from the group consisting of an organic colorant and carbon black.

29. A process according to claim 20, wherein the dimensions of the powdered materials are between 0.01 and 300 mm.

30. A process according to claim 1, wherein, when the hydrolysis catalyst crosslinking agent is in the solid state, it is used in the form of a powder.

31. A process according to claim 1, wherein, when the hydrolysis catalyst crosslinking agent is liquid, it is used:
   in the form of a powder serving as support, like silica, or a thermoplastic compound corresponding to the component (a), impregnated with the said catalyst;
   through the intermediacy of a gaseous carrier, in particular by injection into water vapour.

32. A process according to claim 1, wherein the component (a) comprises at least one homopolymer of ethylene.

33. A process according to claim 1, wherein the component (b) is present in a concentration of 20 to 80% by weight in the bulk polymerized grafted and crosslinkable thermoplastic polyolefin powder composition.

34. A process according to claim 33, wherein the component (a) is present in a concentration of 80 to 20% by weight.

* * * * *

UNITED STATES PATENT AND TRADEMARK OFFICE
CERTIFICATE OF CORRECTION

PATENT NO. : 6,395,839 B2  
DATED : May 28, 2002  
INVENTOR(S) : Dominique Valligny Page 1 of 1

It is certified that error appears in the above-identified patent and that said Letters Patent is hereby corrected as shown below:

<u>Column 15,</u>
Line 53, reads "which are is," should read -- which is --

<u>Column 16,</u>
Line 19, reads "cylohexenyl," should read -- cyclohexnyl --
Line 44, reads "farther," should read -- further --

<u>Column 17,</u>
Line 8, reads "at one," should read -- at least one --
Line 20, reads "claim 20," should read -- claim 26 --

<u>Column 18,</u>
Line 3, reads "claim 20," should read -- claim 26 --

Signed and Sealed this

Eighteenth Day of May, 2004

JON W. DUDAS
*Acting Director of the United States Patent and Trademark Office*